(12) United States Patent
Schmidt

(10) Patent No.: US 8,840,254 B2
(45) Date of Patent: Sep. 23, 2014

(54) DUAL PROJECTOR CROSS-MIRROR ACTUATOR MECHANISM

(75) Inventor: Terrence Carl Schmidt, Wellesley (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 338 days.

(21) Appl. No.: 13/451,068

(22) Filed: Apr. 19, 2012

(65) Prior Publication Data

US 2013/0278904 A1 Oct. 24, 2013

(51) Int. Cl.
*G03B 21/28* (2006.01)

(52) U.S. Cl.
USPC .............................. 353/94; 353/99

(58) Field of Classification Search
USPC ................ 353/69, 70, 77, 78, 79, 98, 99, 94; 348/745
See application file for complete search history.

(56) References Cited

U.S. PATENT DOCUMENTS

| 7,370,976 B2 * | 5/2008 | Fujinuma ........................ 353/69 |
| 8,251,514 B2 * | 8/2012 | Murakami ....................... 353/69 |
| 2003/0137612 A1 | 7/2003 | Chang et al. |
| 2004/0021835 A1 | 2/2004 | Yamada et al. |
| 2007/0035670 A1 * | 2/2007 | Prior et al. ..................... 348/745 |
| 2007/0195441 A1 * | 8/2007 | Aizawa et al. ................. 359/871 |
| 2007/0273985 A1 | 11/2007 | Fujinuma |
| 2008/0284986 A1 * | 11/2008 | Tachibana ....................... 353/69 |

FOREIGN PATENT DOCUMENTS

| EP | 2184638 A1 | 5/2010 |
| JP | 2002077777 A | 3/2002 |

OTHER PUBLICATIONS

Corresponding European Patent Application No. 13164304.1 Search Report dated Nov. 21, 2013.

\* cited by examiner

*Primary Examiner* — William C Dowling
(74) *Attorney, Agent, or Firm* — Perry + Currier Inc.

(57) ABSTRACT

A mirror actuator system is provided for aligning images projected onto a curved screen by dual projectors. According to a preferred embodiment, a unique screw mechanism is provided for selectively slightly warping the mirror. The screw mechanism includes a load spreader in contact with the mirror, having a groove for receiving an screw actuator for applying positive or negative pressure to the load spreader and thereby to a local area (i.e. zone) of the mirror. The actuator system of the present invention provides low cost static pressure adjustment to the mirror for maintaining the focus quality while locally modifying the geometric 'aim' of the mirror. The groove in the load spreader provides tolerance to prevent thermal coefficient of expansion (TCE) distortion.

9 Claims, 6 Drawing Sheets

DUAL PROJECTOR CROSS-MIRROR ACTUATOR MECHANISM

FIELD OF THE INVENTION

The present invention relates to dual projector systems, and more particularly to a mirror actuator system for aligning images projected onto a curved screen by dual projectors.

BACKGROUND OF THE INVENTION

Dual Projector systems that are used on very large curved screens for both 3D and non-3D digital cinema applications cannot be aligned in, or overlaid on, a pixel-for-pixel manner due to optical geometric errors. Although in theory, digital image warping may be used to correct for such misalignment, in practice electronic warping at 4K and high frame rate speeds is very difficult and expensive. This is because in order to avoid image quality degradation, warping requires many more pixels on the imager panel than are displayed by the image content (e.g. in digital cinema, the image content can be 4096×2160 pixels and is encrypted).

Crossed (i.e. X) mirrors as well as single mirror systems have been used to co-locate the optical projection axes of dual projection lenses more closely in order to minimize alignment errors. For example, it is known to use crossed mirror systems in 3D CAD using rear projection flat screens having short throw distances to preserve alignment and minimize optical geometric distortion between left and right eye images. Unlike the flat screens used for 3D CAD applications, the large high gain screens used for 3D cinema are almost always tightly curved. At 4K image resolution, projection on conventional short throw, very large tightly curved screens, results in unacceptably low image registration, particularly for 2D projection, and consequent lack of sharp resolution (as measured by the modulation transfer function (MTF)).

SUMMARY OF THE INVENTION

According to an aspect of the present invention, a mirror actuator system is provided for aligning images projected onto a curved screen by dual projectors. According to a preferred embodiment, a unique screw mechanism is provided for selectively slightly warping the mirror in order to gently correct so-called 'smile' differences at the lower part of the images so as to provide 2D 4K pixel-on-pixel alignment accuracy. The screw mechanism includes a load spreader in contact with the mirror, having a slot or groove for receiving a screw actuator used to apply positive or negative pressure to the load spreader and thereby to a local area (i.e. zone) of the mirror. The actuator system of the present invention provides low cost static pressure adjustment to the mirror for maintaining the focus quality while locally modifying the geometric 'aim' of the mirror. The groove in the load spreader provides clearance tolerance to prevent thermal coefficient of expansion (TCE) errors from affecting the mirror flatness.

This together with other aspects and advantages that will be subsequently apparent reside in the details of construction and operation as more fully hereinafter described and claimed, reference being had to the accompanying drawings forming a part hereof, wherein like numerals refer to like parts throughout.

DESCRIPTION OF THE EMBODIMENTS

Figure 1:
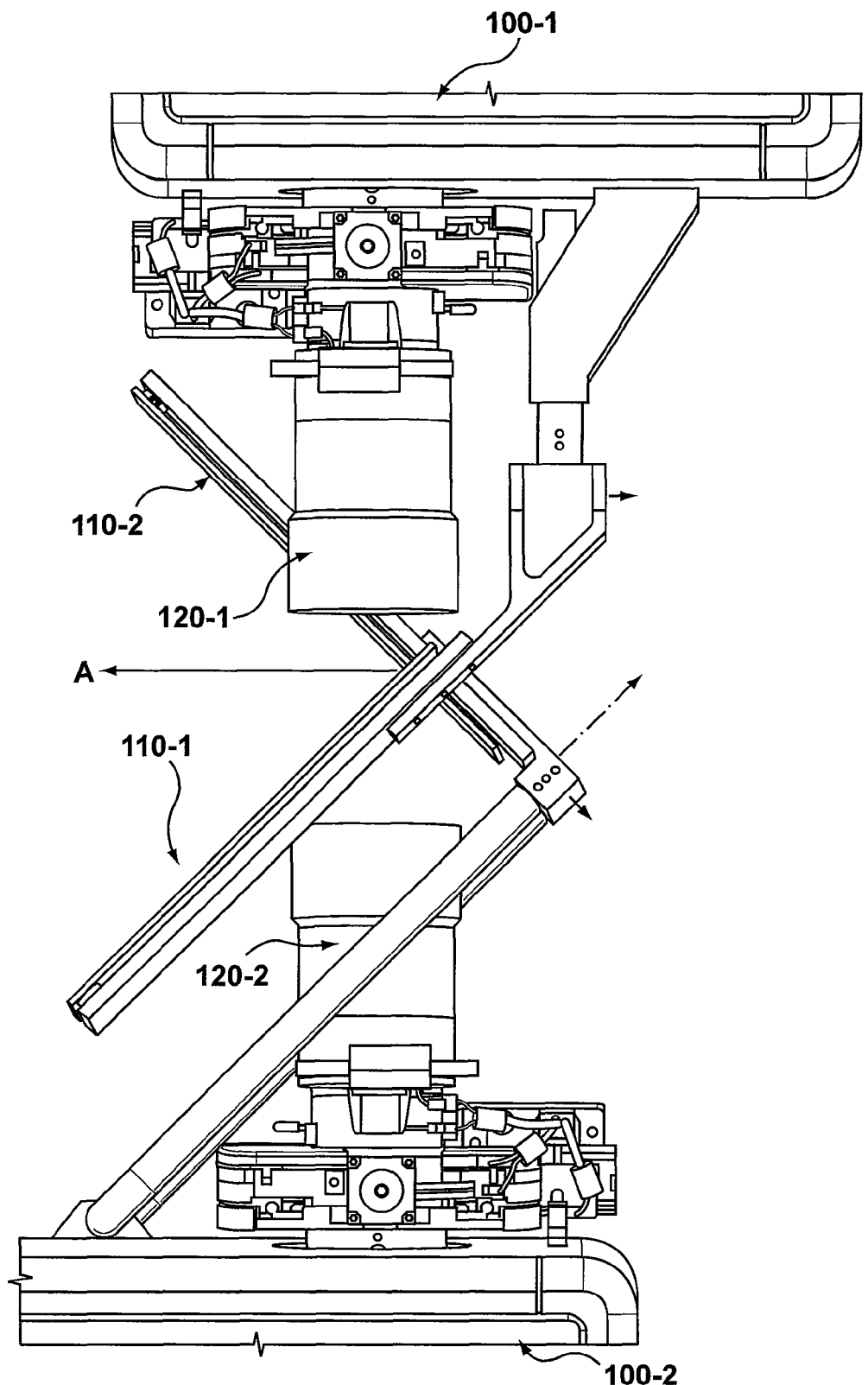
FIG. 1 is a top view of a dual projector system having cross-mirrors, according to the prior art.
Figure 2:
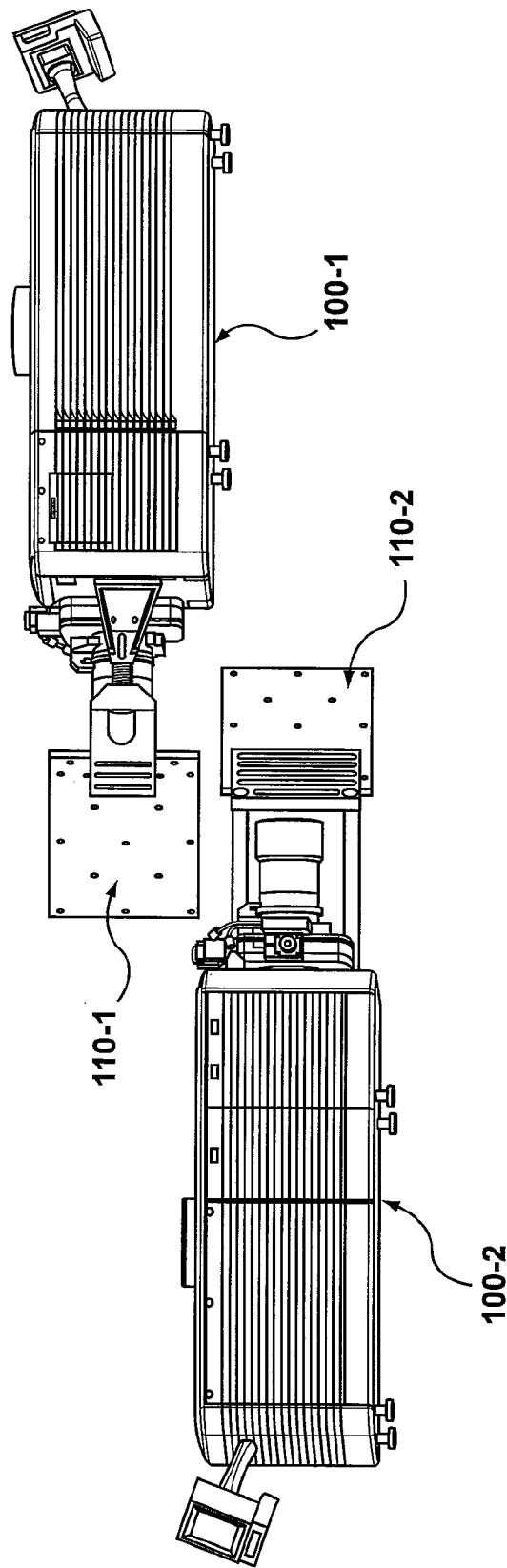
FIG. 2 is a side view of the dual projector system of FIG. 1.
Figure 3:
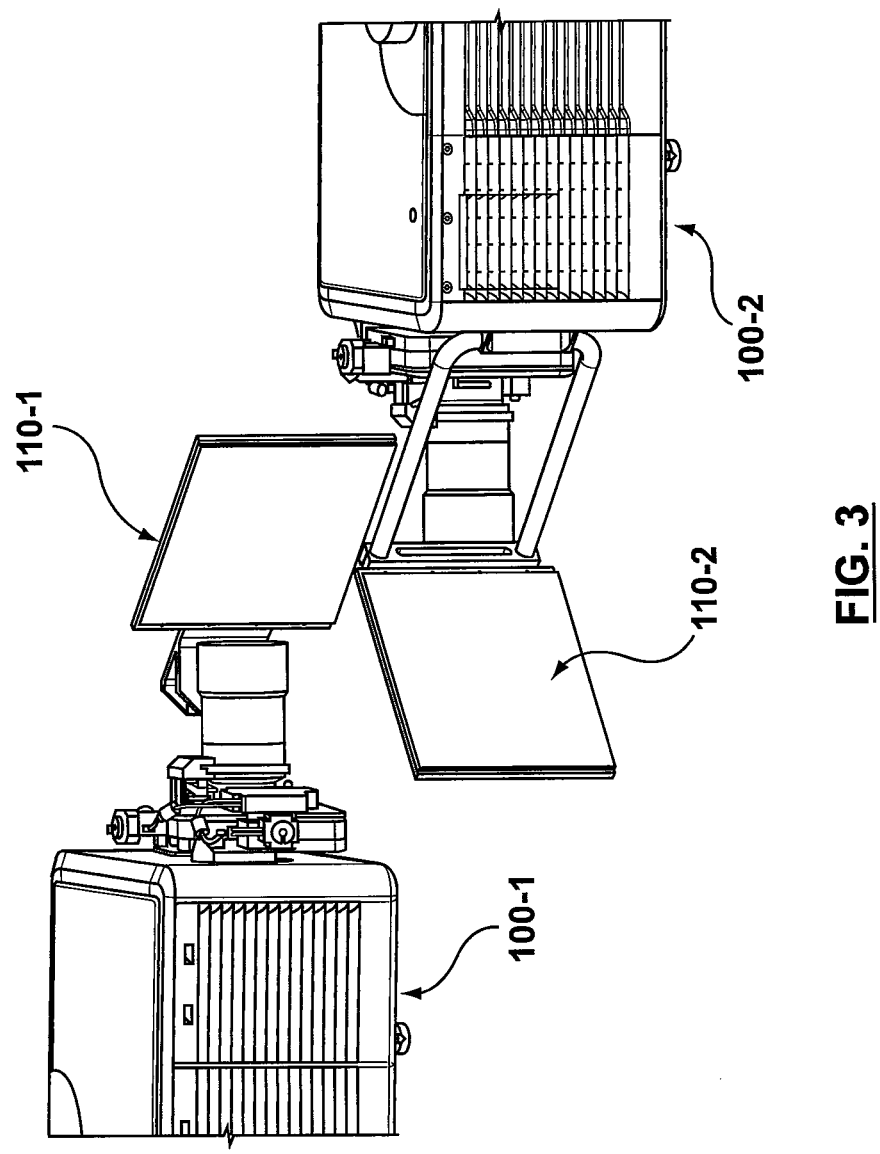
FIG. 3 is a perspective view of the dual projector system of FIG. 1

FIGS. 1-3 are top, side and perspective views, respectively, of a dual projector system, comprising a first projector 100-1 having a mirror 110-1 for reflecting light from a lens 120-1 of the projector 100-1 in the direction of arrow A, and a second projector 100-2 having a mirror 110-2 for reflecting light from a lens 120-2 of the projector 100-2 also in the direction of arrow A (i.e. the light from projectors 100-1 and 100-2 are co-axial). As shown in FIG. 2, the projector 100-2 is positioned below the projector 100-1, so that the mirrors 110-1 and 110-2 form an "X" shape when viewed from above, as shown in FIG. 1. In one embodiment, the mirrors 110-1 and 110-2 are 6 mm Aluminum enhanced first surface glass mirrors. Alternatively, the projector 100-2 may be positioned above the projector 100-1. The aligned light beams projectors 100-1 and 100-1 is projected onto a large, tightly curved cinema screen (not shown).

As discussed above, the curvature of the screen causes unacceptably low image registration of the projected image, particularly critical for 2D projection, as well as a characteristic 'smile' distortion that most often occurs near the bottom of the curved screen. Both images curve near the screen's bottom edge, but unequal amounts due to the different projection down angles.

Figure 4:
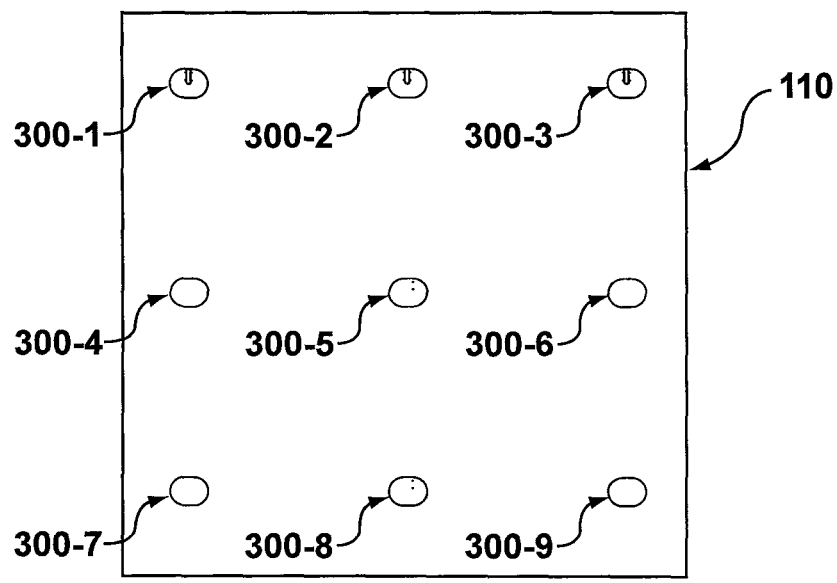
FIG. 4 is a side view of a mirror for use in the dual projector system of FIGS. 1-3, incorporating a mirror actuator system, according to the present invention.
Figure 5:
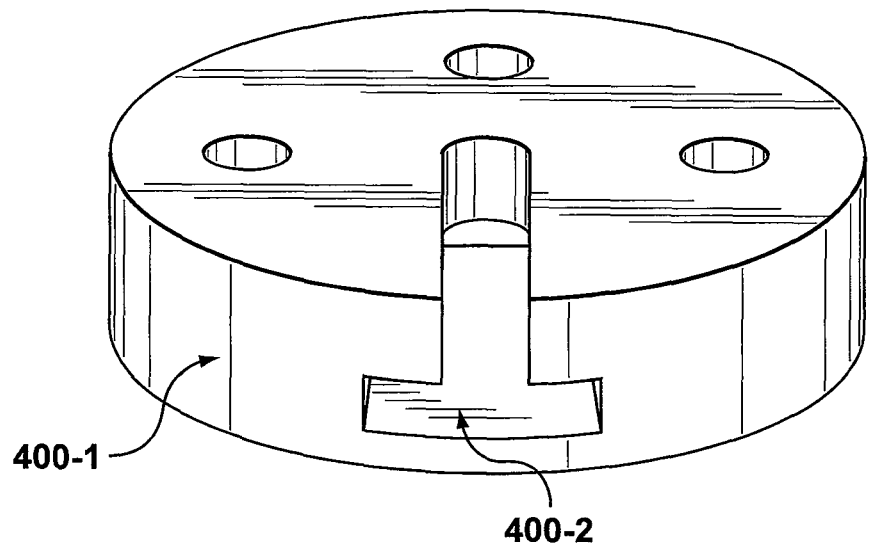
FIG. 5 is a perspective view of a load spreader forming part of the mirror actuator system, according to the present invention.
Figure 6:
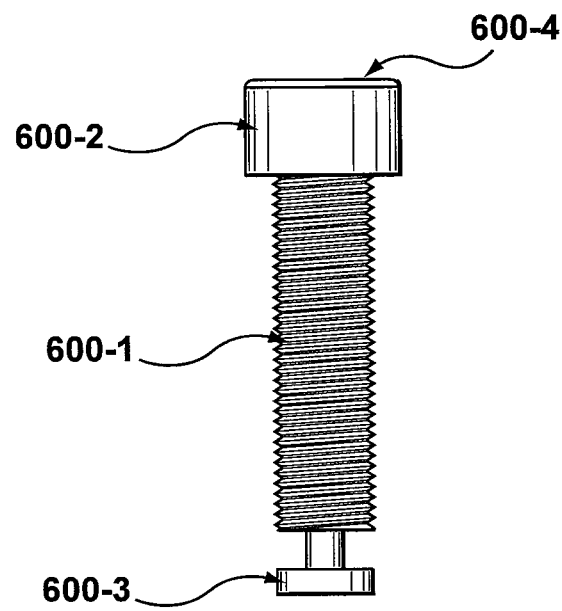
FIG. 6 is a side view of an actuator screw forming part of the mirror actuator system, according to the present invention.
Figure 7:
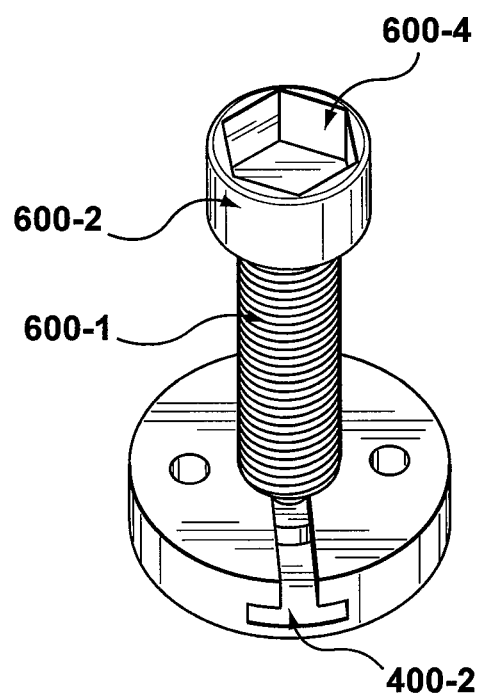
FIG. 7 is a perspective view of the actuator screw of FIG. 6.

According to the present invention, as shown in FIG. 4, mirror 110 (i.e. each of mirrors 110-1 and 110-2) includes a plurality of highly stable mirror actuators 300-1, 300-2, 300-3, etc., for slightly pushing and/or pulling localized areas of the mirror 110 (i.e. mirror warping) so that registration errors can be eliminated resulting in accurate overlay of the images from the two projectors 100-1 and 100-2.

Figure 8:
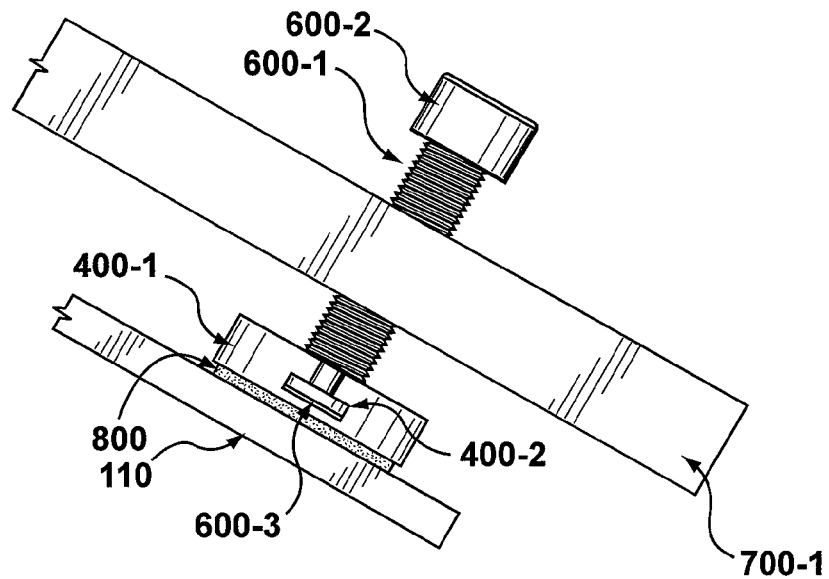
FIG. 8 is a top view showing one of a plurality of mirror actuators of the mirror actuator system according to the present invention, for warping a zone of the mirror shown in FIG. 4.
Figure 9:
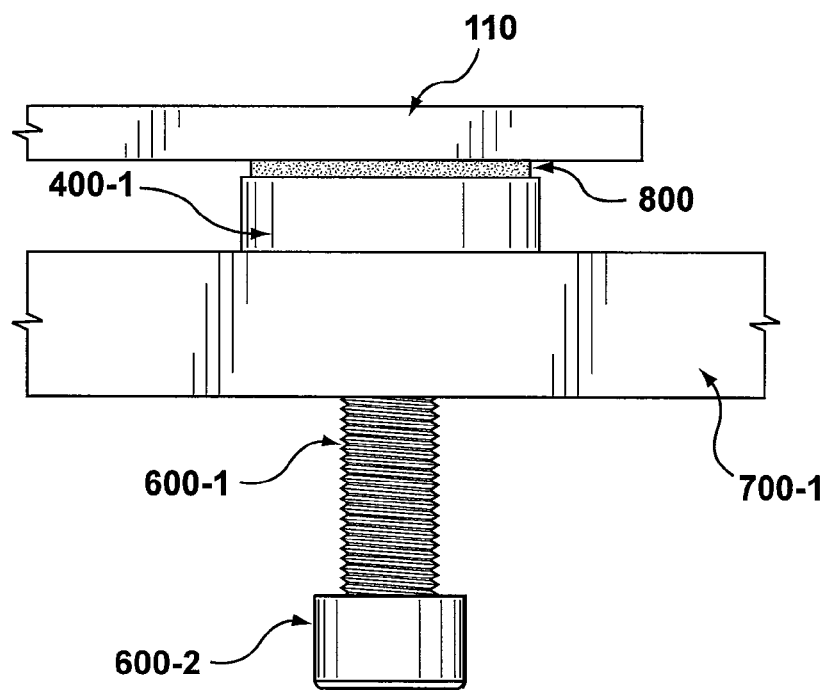
FIG. 9 is a top view of the actuator of FIG. 8 in a gluing position showing the position of the actuator during mirror attachment.

As shown in FIGS. 5-9, each mirror actuator comprises a finely threaded screw adjuster 600-1 extending through a threaded hole in a plate 700-1, and a companion load spreader 400-1 in contact with the mirror 110. It is further appreciated that FIG. 8 depicts an actuator as it is being used, while FIG. 9 depicts the position of actuator pads during a gluing operation to the back side of the first surface mirror. In one embodiment, as depicted in FIGS. 8 and 9, the load spreader 600-1 is glued to the mirror 110. Selection of appropriate glue 800 is important. Use of strong rigid curing glue can result in uneven warping of the mirror in localized areas. Therefore, according to the preferred embodiment, an RTV (Room Temperature Vulcanizing) silicone sealant may be used for glue 800, which remains flexible but stable using an about 0.010" to about 0.050" thick controlled glue line thickness. It is also contemplated that a two part special silicone may be used for reducing the cure time.

The screw adjuster 600-1 has a standard knurled round grip 600-2, suitable for finger adjustment (i.e. rotation) of the screw adjuster relative to the plate 700-3. In one embodiment, an Allan hex socket 600-4 is also provided for receiving a ball head Allan driver. A T-shaped head 600-3 fits into an undercut T-shaped groove 400-2 machined into the load spreader 400-1 from one side to the center thereof.

By rotating the screw adjuster 600-1 so as to advance toward the mirror 110, load spreader 400-1 is caused to apply pressure to the mirror in the region where the load spreader contacts the mirror, causing outward (convex) warping of the mirror in the region of the mirror actuator. Likewise, rotating the screw adjuster 600-1 so as to retreat from the mirror 110, load spreader 400-1 is caused to pull on the mirror in the region where the load spreader contacts the mirror, inward (concave) warping of the mirror in the region of the mirror actuator.

In one embodiment, screw 600-1 is a 8 mm stainless steel screw, plate 700-1 is a 12 mm aluminum plate and load spreader 400-1 is made of 6 mm aluminum. In one embodiment, the groove 400-2 is created by machining an aluminum block with a special "T" cutter. As an alternative to machining, the T groove 400-2 can be formed by any well known aluminum extrusion method, in which case the T groove 400-2 extends through the entire spreader (i.e. being sliced off a long extrusion) rather than stopping at the center. Centering of the "T" screw adjuster 600-1 for assembly may be accomplished by insertion of small compliant plastic or silicone molded parts from each side of the "T" groove 400-2 to hold the screw adjuster 600-1 in the center.

A person of skill in the art will appreciate that these dimensions are exemplary only and that other dimensions are possible.

By using multiple actuators, as shown in FIG. 3, positive/negative forces can be applied at various spatial locations on the mirror 110 causing it to bend very slightly in order to correct geometric distortion and thereby overlay pixels from the two projectors 100-1 and 100-2. Clearance is provided between the head 600-3 and walls of the groove 400-2 so that zero pressure is applied if no warp is required, assuring a flat mirror as a starting point for the dual projector alignment.

The mirror actuator system of the present invention permits accurate and stable image warping at low cost making it practical for one-time adjustment during set-up, and to remove the common 'smile' distortion that most often occurs near the bottom of the curved screen in modern stadium seating digital theatre auditoriums as well as correcting other minor errors that may be caused by localized screen geometry errors.

Although embodiments of the invention have been described and illustrated in detail, various modifications and changes may be made. While preferred embodiments are described above, some of the features described above can be replaced or even omitted. For example, the principles set forth above apply as well to dual projector systems that use only a single mirror (e.g. a "T" mirror) rather than two crossed mirrors. Also, although nine mirror actuators are shown in FIG. 3, arranged in a rectangular array, a fewer or greater number of actuators may be used, and the actuators may be disposed in other geometrical arrangements than a rectangular array. This and other alternatives and modifications are believed to be within the scope of the invention.

The invention claimed is:

1. A mirror actuator system for aligning images projected by dual projectors, wherein each projector uses at least one mirror, comprising:
   a plurality of load spreaders contacting said at least one mirror at various locations; and
   a plurality of screw adjusters for applying force to said load spreaders for bending said at least one mirror at said various locations in order to correct geometric distortion and thereby align the images from said dual projectors, wherein each of said screw adjusters includes a head portion, and each of said load spreaders includes a groove for receiving said head portion, and wherein clearance is provided in said groove for providing tolerance to thermal coefficient of expansion between said groove and head portion.

2. The mirror actuator system of claim 1, wherein said head portion and said groove are T-shaped.

3. The mirror actuator system of claim 2, wherein each of said screw adjusters extends through a threaded plate.

4. The mirror actuator system of claim 3, wherein each of said load spreaders is glued to said at least one mirror at one of said various locations.

5. The mirror actuator system of claim 4, wherein said load spreaders are glued using a stable elastic material for preventing localized distortion of the mirror due to glue shrinkage or aluminum/glass mismatch of thermal coefficient of expansion.

6. The mirror actuator system of claim 5, wherein said stable elastic material comprises a Room Temperature Vulcanizing (RTV) silicone sealant.

7. The mirror actuator system of claim 5, wherein said stable elastic material comprises a two part silicone adhesive.

8. The mirror actuator system of claim 4, wherein each of said screw adjusters includes a knurled round grip for finger rotation of the screw adjuster relative to the threaded plate.

9. The mirror actuator system of claim 8, wherein each of said screw adjusters includes a hex socket for receiving hex socket driver for rotation of the screw adjuster relative to the threaded plate.

* * * * *